United States Patent
Lacoss-Arnold et al.

(10) Patent No.: US 10,467,706 B2
(45) Date of Patent: Nov. 5, 2019

(54) SYSTEMS AND METHODS FOR LOCATING MERCHANT TERMINALS BASED ON TRANSACTION DATA

(71) Applicant: MASTERCARD INTERNATIONAL INCORPORATED, Purchase, NY (US)

(72) Inventors: Jason Jay Lacoss-Arnold, St. Louis, MO (US); Vincent A. Haulotte, Manchester, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 361 days.

(21) Appl. No.: 14/862,704

(22) Filed: Sep. 23, 2015

(65) Prior Publication Data

US 2017/0083985 A1    Mar. 23, 2017

(51) Int. Cl.
*G06Q 40/00*    (2012.01)
*G06Q 20/20*    (2012.01)
(Continued)

(52) U.S. Cl.
CPC ............ *G06Q 40/12* (2013.12); *G06Q 20/20* (2013.01); *G06Q 20/3224* (2013.01);
(Continued)

(58) Field of Classification Search
CPC .......... G06Q 20/3224; G06Q 20/4016; G06Q 20/20; G06Q 20/205; G06Q 40/12; H04W 64/00
See application file for complete search history.

(56) References Cited

U.S. PATENT DOCUMENTS

| | | | | |
|---|---|---|---|---|
| 9,836,743 | B2 * | 12/2017 | Celikyilmaz | G06Q 20/40 |
| 2007/0174082 | A1 * | 7/2007 | Singh | G06Q 20/20 |
| | | | | 705/44 |

(Continued)

FOREIGN PATENT DOCUMENTS

WO    WO2007/004224    1/2007

OTHER PUBLICATIONS

Ho, Shuk Ying, and Patrick YK Chau. "The effects of location personalization on integrity trust and integrity distrust in mobile merchants." International Journal of Electronic Commerce 17.4 (2013) (Abstract Only) p. 5.*

*Primary Examiner* — Asfand M Sheikh
(74) *Attorney, Agent, or Firm* — Harness, Dickey & Pierce, P.L.C.

(57) ABSTRACT

Systems and methods are provided for use in locating one or more merchant terminals based on transaction data associated with the terminals. One exemplary method generally includes accessing, by a computing device, transaction data for a transaction to a payment account between a merchant and a consumer at a merchant terminal where the transaction data includes a terminal ID for the merchant terminal, a merchant ID of the merchant, an acquirer ID for an acquirer associated with the merchant, and a temporal indicator. In addition, the method includes receiving, by the computing device, location data associated with the transaction, identifying, by the computing device, a location associated with the location data as a location of the merchant terminal, and assigning, by the computing device, a score to the identified location indicative of a confidence that the identified location is the actual location of the merchant terminal.

18 Claims, 4 Drawing Sheets

(51) Int. Cl.
*G06Q 20/32* (2012.01)
*G06Q 20/40* (2012.01)
*G06Q 30/02* (2012.01)
*H04W 64/00* (2009.01)

(52) U.S. Cl.
CPC ..... *G06Q 20/4016* (2013.01); *G06Q 30/0205* (2013.01); *H04W 64/00* (2013.01)

(56) References Cited

U.S. PATENT DOCUMENTS

| | | | |
|---|---|---|---|
| 2008/0222038 A1* | 9/2008 | Eden | G06Q 20/04 705/44 |
| 2011/0251910 A1* | 10/2011 | Dimmick | G06Q 20/12 705/17 |
| 2013/0203444 A1* | 8/2013 | Perry | G06Q 20/3224 455/456.3 |
| 2015/0051953 A1 | 2/2015 | Howe | |
| 2015/0161603 A1* | 6/2015 | Fish | G06Q 20/40 705/44 |

* cited by examiner

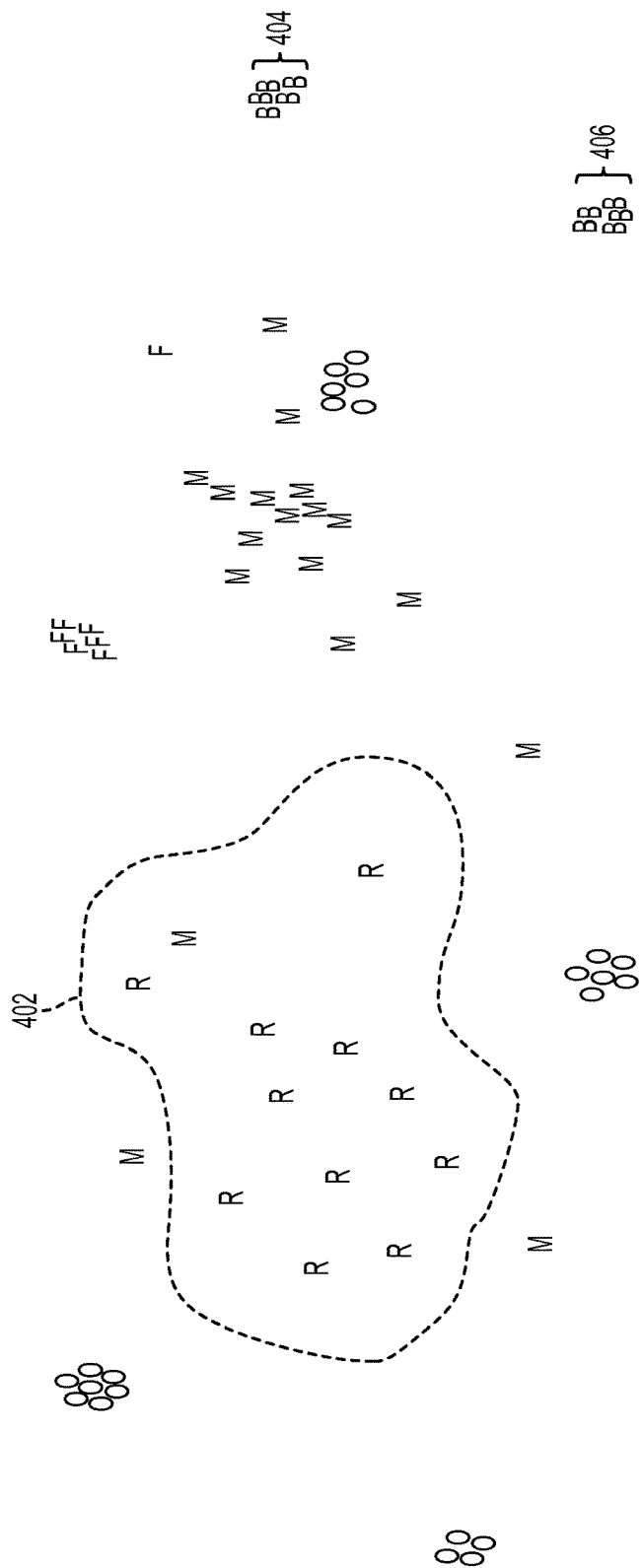

SYSTEMS AND METHODS FOR LOCATING MERCHANT TERMINALS BASED ON TRANSACTION DATA

FIELD

The present disclosure generally relates to systems and methods for use in locating one or more merchant terminals based on transaction data, for example, for purchase transactions made at the terminals, and also based on location data associated with consumers making the transactions.

BACKGROUND

This section provides background information related to the present disclosure which is not necessarily prior art.

Merchants often offer products (e.g., goods and services, etc.) for sale to consumers. The products may be purchased through a variety of means, including, for example payment accounts. As part of product purchases via payment accounts, by consumers, data is transferred between different entities to authorize, settle and/or clear the transactions, i.e., as transaction data. In connection therewith, the transaction data is often stored by one or more of the different entities, and subsequently used, for a variety of purposes, including marketing, etc.

DRAWINGS

The drawings described herein are for illustrative purposes only of selected embodiments and not all possible implementations, and are not intended to limit the scope of the present disclosure.

Figure 1:
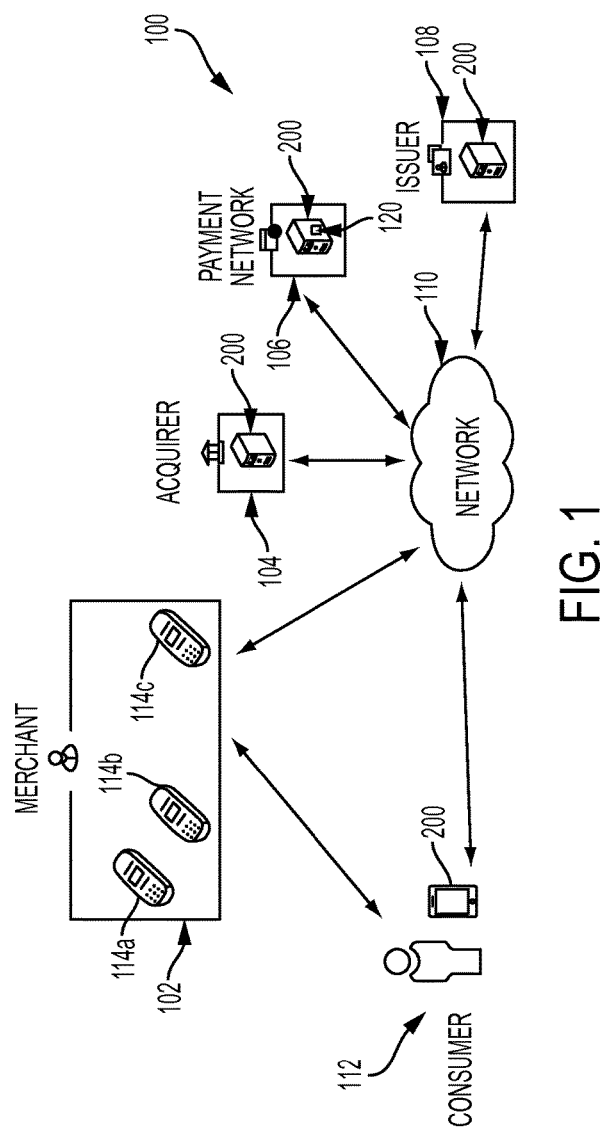
FIG. 1 is a block diagram of an exemplary system of the present disclosure suitable for use in locating merchant terminals based on transaction data for product purchases at the terminals.
Figure 3:
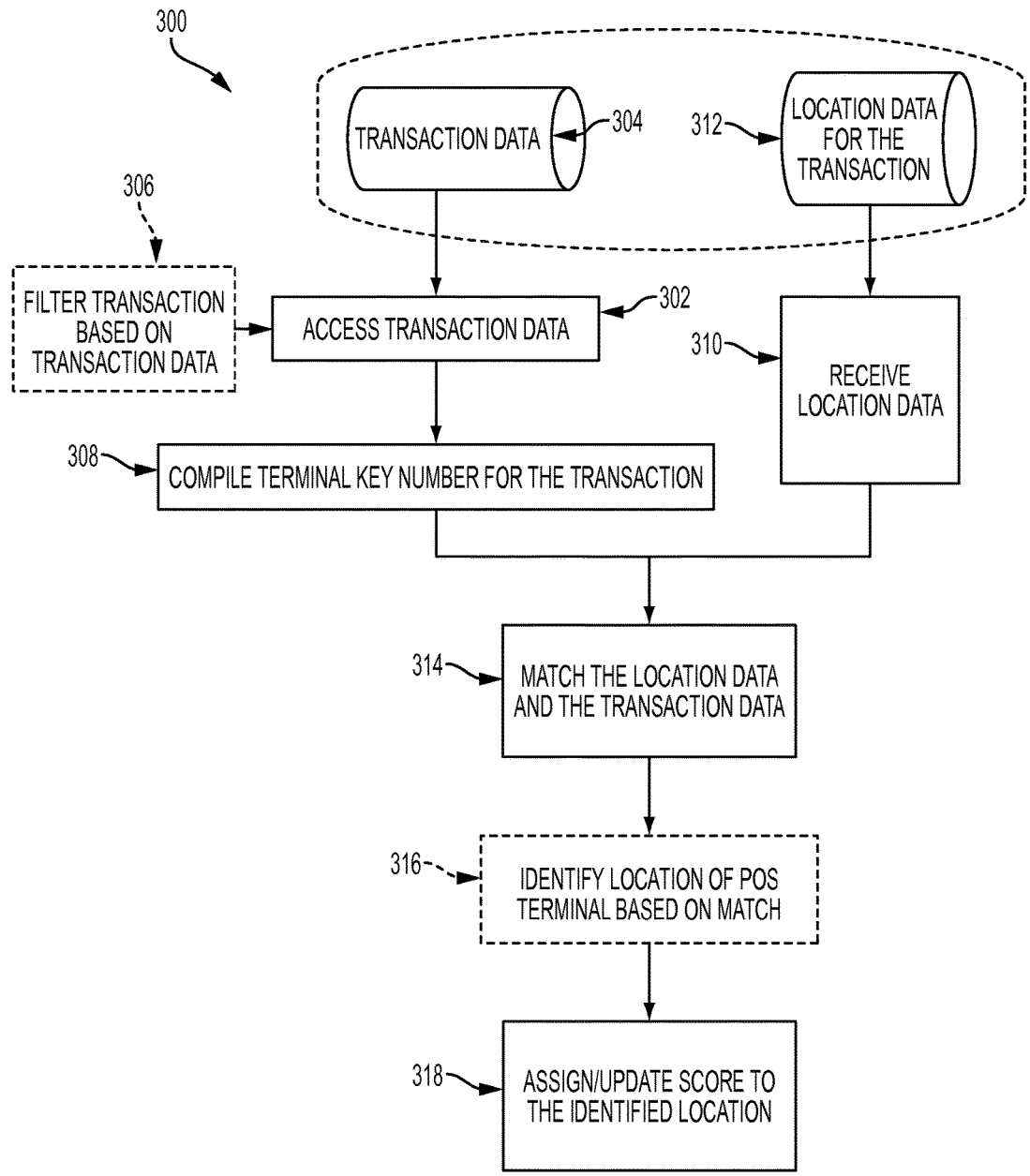

FIG. 3 is an exemplary method suitable for use with the system of FIG. 1 for scoring a merchant terminal in connection with locating the merchant terminal; and FIG. 4 is a schematic illustrating multiple different transactions at a number of different point of sale (POS) terminals (broadly, merchant terminals), with locations of the POS terminals identified in connection with the system of FIG. 1 and/or the method of FIG. 3.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Consumers enter into transactions with merchants to purchase products (e.g., goods or services). In processing the transactions, location data for the merchants, and in particular, for POS terminals associated with the merchants may be missing or inaccurate. For example, location data, upon which the POS terminals are configured, may be generic corporate addresses that are different than actual locations of the transactions. The systems and methods herein capture locations of transactions from other sources, such as, for example, smartphones or other portable computing devices associated with the consumers, and correlate the locations of the other sources to the corresponding transactions. The locations indicated by these other sources are then combined to provide scores indicative of confidences that the POS terminals used at the transactions (e.g., as identified by terminal IDs for the POS terminals, etc.) are located at one or more particular locations. In this manner, the locations of the POS terminals are identified, with the scores indicating the general confidences in the locations, which may account for fixed and/or mobile natures of the POS terminals.

FIG. 1 illustrates an exemplary system 100 in which one or more aspects of the present disclosure may be implemented. Although parts of the system 100 are presented in one arrangement, it should be appreciated that other exemplary embodiments may include the same or different parts arranged otherwise, for example, depending on processing of payment transactions, transmittal of location data, storage of transaction and/or location data, etc.

As shown in FIG. 1, the illustrated system 100 generally includes a merchant 102, an acquirer 104, a payment network 106, and an issuer 108, each coupled to network 110. The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 114 includes multiple networks, where different ones of the multiple networks are accessible to different ones of the illustrated parts in FIG. 1. In this example, the network 110 may include a private payment transaction network made accessible by the payment network 106 to the acquirer 104 and the issuer 108 and, separately, a network through which the payment network 106 and consumer 112 may communicate (e.g., via a website or web-based application provided by the payment network 106, etc.).

The merchant 102 may be any merchant, at which consumers (e.g., the consumer 112) may complete transactions for products (e.g., goods or services, etc.). As shown, in the system 100 the merchant 102 includes three different POS terminals 114a-c. The POS terminals 114a-c are used, at the merchant 102, to authorize transactions, as described below. In various embodiments, the POS terminals 114a-c are each associated with a terminal identifier or terminal ID. For example, each of the POS terminals 114a-c may be configured with a unique, different terminal ID or, alternatively, each of the POS terminals 114a-c (or multiple, but not all of POS terminals 114a-c), being located at the same location of the merchant 102, may be configured with the same terminal ID. In further embodiments, POS terminals at different locations of the merchant 102 (not shown) may be configured with the same terminal ID as the POS terminals 114a-c, or different terminal IDs.

In the system 100, the terminal ID for each of the POS terminals 114a-c, of the merchant 102, as will be described below, is included in transaction data for transactions completed at the POS terminals 114a-c. When each of the POS terminals 114a-c is configured with a unique terminal ID, the transactions are identifiable to the particular POS terminal. Alternatively, when all of the POS terminals 114a-c are configured with the same terminal ID, the transactions at those POS terminals may only be identifiable, in general, to the merchant 102 (or the particular location of the merchant 102 illustrated in FIG. 1).

It should be appreciated that while the merchant 102, and therefore the POS terminals 114a-c, are generally static or immobile in the system 100, other merchants (not shown) may include or may provide access to POS terminals that are not static (or are mobile). In one example, a food truck may include a POS terminal, which moves with the food truck from location to location, as desired. In another example, a taxi driver may have a POS terminal in the taxi cab, which moves through the locations of travel of the taxi cab. Of course, numerous other mobile merchants are known.

Figure 2:
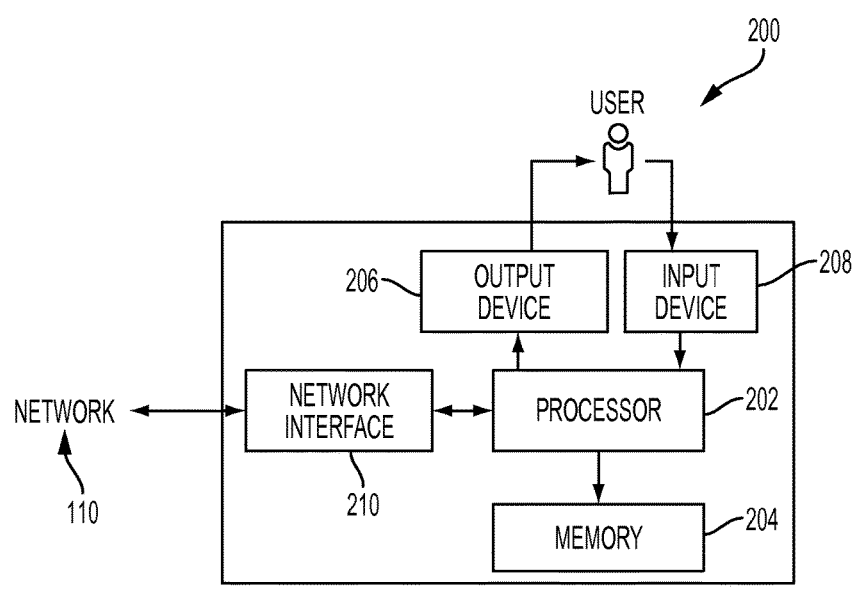
FIG. 2 is a block diagram of a computing device, that may be used in the exemplary system of FIG. 1.

FIG. 2 illustrates exemplary computing device 200, which is suitable for use in the system 100. By way of example (and without limitation), the exemplary computing device 200 may include one or more servers, workstations, personal computers, laptops, tablets, PDAs, telephones (e.g., cellular phones, smartphones, other phones, etc.), POS terminals, combinations thereof, etc. as appropriate. In the system 100 (of FIG. 1), the acquirer 104, the payment network 106, the issuer 108, and the consumer 112 are each associated with, or implemented in, a computing device 200 (the consumer's computing device 200 may include a portable communication device, etc.). In addition, each of the POS terminals 114a-c in the system 100 is also consistent with the computing device 200. With that said, it should be appreciated that the system 100 is not limited to the computing device 200, as different computing devices and/or arrangements of computing devices may be used. It should also be appreciated that different components and/or arrangements of components may be used in other computing devices. Further, in various exemplary embodiments, the computing device 200 may include multiple computing devices located in close proximity, or distributed over a geographic region (such that each computing device 200 in the system 100 may represent multiple computing devices), so long as the computing devices are specifically configured to function as described herein.

With reference to FIG. 2, the illustrated computing device 200 generally includes a processor 202, and a memory 204 that is coupled to the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and are not intended to limit in any way the definition and/or meaning of processor.

The memory 204, as described herein, is one or more devices that enable information, such as executable instructions and/or other data, to be stored and retrieved. The memory 204 may include one or more computer-readable storage media, such as, without limitation, dynamic random access memory (DRAM), static random access memory (SRAM), read only memory (ROM), erasable programmable read only memory (EPROM), solid state devices, CD-ROMs, thumb drives, tapes, flash drives, hard disks, and/or any other type of volatile or nonvolatile physical or tangible computer-readable media. The memory 204 may be configured to store, without limitation, transaction data, location data, terminal IDs, terminal key numbers, identified locations, confidence scores, and/or any other types of data discussed herein and/or suitable for use as described herein, etc.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable storage media. It should be appreciated that the memory 204 may include a variety of different memories, each implemented in one or more of the functions or processes described herein.

The illustrated computing device 200 also includes an output device 206 that is coupled to the processor 202. The output device 206 outputs, or presents, to a user of the computing device 200 (e.g., the consumer 112; individuals associated with one or more of the merchant 102, the acquirer 104, the payment network 106, or the issuer 108 in the system 100; etc.) by, for example, displaying, audibilizing, and/or otherwise outputting information and/or data. It should be further appreciated that, in some embodiments, the output device 206 may comprise a display device such that various interfaces (e.g., applications, webpages, etc.) may be displayed at computing device 200, and in particular at the display device, to display such information and data, etc. And in some examples, the computing device 200 may cause the interfaces to be displayed at a display device of another computing device, including, for example, a server hosting a website having multiple webpages, etc. With that said, output device 206 may include, without limitation, a liquid crystal display (LCD), a light-emitting diode (LED) display, an organic LED (OLED) display, an "electronic ink" display, speakers, combinations thereof, etc. In some embodiments, the output device 206 includes multiple units. The computing device 200 further includes an input device 208 that receives input from the user of the computing device 200. The input device 208 is coupled to the processor 202 and may include, for example, a keyboard, a pointing device, a mouse, a stylus, a touch sensitive panel (e.g., a touch pad or a touch screen, etc.), another computing device, and/or an audio input device. Further, in some exemplary embodiments, a touch screen, such as that included in a tablet, a smartphone, or similar device, may behave as both an output device and an input device. In at least one exemplary embodiment, an output device and/or an input device are omitted from a computing device.

In addition, the illustrated computing device 200 includes a network interface 210 coupled to the processor 202 (and, in some embodiments, to the memory 204 as well). The network interface 210 may include, without limitation, a wired network adapter, a wireless network adapter, a mobile telecommunications adapter, or other device capable of communicating to one or more different networks, including the network 110. In some exemplary embodiments, the computing device 200 includes the processor 202 and one or more network interfaces incorporated into or with the processor 202.

In various embodiments herein, the input device 208 and/or the network interface 210 may include, among other things, a GPS antenna suitable to capture GPS signals for processing by the processor 202 to determine the location of the computing device 200 (e.g., in connection with the consumer's computing device 200, etc.). In addition (or alternatively), in various embodiments herein, the computing device 200 may rely on additional or other network signals, via network interface 210, to determine its location. With that said, it should be appreciated that any suitable operations to determine locations, by processors, based on GPS signals (or other network signals) may be used.

Referring again to FIG. 1, generally in the system 100, the merchant 102 offers one or various products for sale to the consumer 112. The consumer 112, to purchase a product, presents payment to the merchant 102. The payment may be provided in the form of cash or a check, or it may be provided through a payment account, etc.

When a payment account is used by the consumer 112 to purchase a product from the merchant 102, the merchant 102, the acquirer 104, the payment network 106, and the issuer 108 cooperate, in response to the consumer 112, to complete a payment account transaction (broadly, a purchase transaction) for the product using the consumer's payment account. As part of the purchase transaction, the consumer 112 initially provides information about the payment account (e.g., a payment account number (PAN), etc.) to the merchant 102 via a payment device (e.g., a payment card, a fob, a payment-enabled smartphone, etc.), or via login credentials for a previously established purchase account (e.g., an electronic wallet such as MasterPass™, Google Wallet™, PayPass™, Softcard®, etc.), etc. The merchant 102, via one of the POS terminals 114a-c, for example, POS terminal 114a in the following description, reads the payment account information and communicates, via the network 110, an authorization request to the payment network 106, via the acquirer 104 (associated with the merchant 102), to process the transaction (e.g., using the MasterCard® interchange, etc.). The authorization request includes various details of the transaction (e.g., transaction data, etc.) to help facilitate processing the authorization request. The payment network 106, in turn, communicates the authorization request to the issuer 108 (associated with the consumer's payment account). The issuer 108 then provides an authorization response (e.g., authorizing or declining the request) to the payment network 106, which is provided back through the acquirer 104 to the merchant 102. The transaction with the consumer 112 is then completed, or not, by the merchant 102, depending on the authorization response. If the transaction is completed, the credit line or funds of the consumer 114, depending on the type of payment account, is then decreased by the amount of the purchase, and the charge is posted to the consumer's payment account. The purchase transaction is later cleared and settled by and between the merchant 102 and the acquirer 104 (in accordance with a settlement arrangement, etc.), and by and between the acquirer 104 and the issuer 108 (in accordance with another settlement arrangement, etc.).

Transaction data is generated as part of the above interactions among the merchant 102 (and POS terminal 114a), the acquirer 104, the payment network 106, the issuer 108, and the consumer 112. Depending on the transaction, the transaction data may include, without limitation, the PAN for the consumer's payment account involved in the transaction, a payment amount, an identifier for the product involved in the transaction, a description of the product involved in the transaction, a merchant ID for the merchant 102, a terminal ID for the POS terminal 114a, an acquirer ID for the acquirer 104, a merchant category code (MCC) assigned to the merchant 102 (e.g., by the payment network 110, etc.), a transaction entry mode (e.g., swipe, Internet order, Apple Pay™, etc.), a temporal indicator (e.g., a date/time stamp, etc.), a location of the merchant 102 (e.g., as indicated in a merchant profile, for example), a location of the payment device (e.g. a smartphone executing an application, etc.), etc.

Once generated, the transaction data is stored in one or more different components of the system 100. In the illustrated embodiment, for example, the payment network 106 stores transaction data in memory 204 of the payment network computing device 200 (e.g., in a data structure associated with the memory 204, etc.). As such, the payment network 106 includes, in the memory 204 of the computing device 200, a compilation of merchants (including merchant 102), POS terminals (including POS terminals 114a-c), and acquirers (including acquirer 104) involved in the various transactions processed by the payment network 106. Further, the transaction data can be organized by terminal key, which is, for example, identified based on at least the terminal ID, the merchant ID, and/or the acquirer ID for each transaction. It should be appreciated that transaction data may be collected and stored differently in other system embodiments, for example, at the merchant 102, the acquirer 104, and/or the issuer 108. Or transaction data may be transmitted between entities of system 100, as used or needed. In addition, while the transaction data is described as stored in the payment network computing device 200, it should be appreciated that the transaction data could be stored apart from the memory 204 of the computing device 200 (e.g., in data structures associated with the payment network 106 but apart from the computing device 200, etc.) in various implementations.

In various exemplary embodiments, consumers (e.g., consumer 112, etc.) involved in the different transactions herein agree to legal terms associated with their payment accounts, for example, during enrollment in their accounts, etc. In so doing, the consumers may agree, for example, to allow merchants, issuers of the payment accounts, payment networks, etc. to use data collected during enrollment and/or collected in connection with processing the transactions, subsequently for one or more of the different purposes described herein.

With continued reference to FIG. 1, the illustrated system 100 also includes a location detector (or engine) 120 associated with (e.g., implemented in, etc.) the computing device 200 of the payment network 106. The location detector 120 is configured, often by executable instructions, to, among other functions described herein, access transaction data and access location data. The location detector 120 is configured to then score a location of the merchant 102 (and particularly of the POS terminal 114a), for example, based on consistency between a location of the consumer 112 and a transaction to merchant 102 performed by the consumer 112, etc. The score can then be used as desired, for example, to provide degrees of confidence that the consumer's computing device 200 is present at the POS terminal, degrees of confidence that the consumer's computing device is not present at the POS terminal, a measure of fraud likelihood at the geographic location for the merchant 102 and/or the POS terminal 114a.

While the location detector 120 is shown in FIG. 1 as incorporated with the computing device 200 of the payment network 106, it may be separate therefrom in other embodiments (e.g., the location detector 120 may be implemented in its own computing device 200, etc.). Further, in other embodiments, the location detector 120 may be associated with other entities shown in FIG. 1 (e.g., the issuer 108, the acquirer 104, etc.), or not shown, or it may be a stand-alone entity separate from other entities in FIG. 1 and configured to communicate therewith via the network 110, for example.

In the system 100, the location detector 120 accesses transaction data for the above purchase transaction through the payment network 106. For example, as previously described, transaction data is stored for the transaction in memory 204 of the computing device 200 associated with the payment network 106. As such, the location detector 120 is able to access the transaction data for the transaction, via the memory 204.

In addition, the payment network 106, and in particular the location detector 120 associated therewith, may further capture and store location information related to the purchase transaction. In some embodiments, the transaction data may include location data as provided by the merchant 102 (e.g., via financial ISO messages, etc.). In some embodiments, the POS terminal 114a may receive location information from a payment device used in the transaction. For example, when the consumer's computing device 200 is used as a payment device (e.g., via a payment application on the computing device 200, etc.), location information for the computing device 200 may be determined using, for example, GPS and/or IP address geolocation services (e.g., via a GPS input device 208, or antenna; the network interface 210 to provide an IP address; etc.), which, in combination with processor 202, then provides a location of the computing device 200 to the POS terminal 114a. The POS terminal 114a then injects the location into the authorization request, whereby the location information becomes part of the transactions data to be accessed by the location detector 120.

Additionally, or alternatively, in some embodiments, the consumer's computing device 200 (whether or not being used as a payment device) transmits location information to the location detector 120, via one or more networks, including network 110 (e.g., GPS location data, IP address location data (e.g., for Internet transactions, etc.), etc.). Or, the location detector 120 may receive, or access, such information from third-party providers (e.g., GPS location providers, IP address geolocation services, etc.). The location information is generally accompanied with a temporal indicator (e.g., a time stamp, etc.), and possibly payment account information.

Further, the location data may be sent from the consumer's computing device 200, in real time, or near real time, or at an interval (e.g., every hour, every 24 hours, weekly, etc.). Real-time may include location data sent to and/or received by the location detector 120 within a few seconds of a transaction (e.g., within about thirty seconds, within about fifteen seconds, within about five seconds, within about three seconds, within about two seconds, etc.), before or after, and near real-time may include location data sent to and/or received by the location detector 120 at a later time following a transaction, but within a few minutes, within a few hours, etc. Moreover, the location data may be pushed by the consumer's computing device 200 at the time of the transaction (or another time), for example, via an application associated with the computing device 200 (e.g., Apple Pay™, etc.). Or, in some embodiments, the location data may be pulled from the consumer's computing device 200, by the location detector 120, at one or more regular intervals and/or when the location detector 120 identifies from the accessed transaction data that a transaction was made by the consumer 112. The location information is then stored by the location detector 120 (e.g., in memory 204 of the payment network's computing device 200, etc.) and accessed, as needed, similar to transaction data, as described above.

FIG. 3 illustrates exemplary method 300 for use in scoring a location of a merchant terminal associated with a merchant. The exemplary method 300 is described as implemented in the location detector 120 of the payment network 106 in the system 100, with further reference to the merchant 102, the POS terminals 114a-c, the acquirer 104, the issuer 108, and the consumer 112. The method 300, however, could be implemented in one or more other entities or parts of the system 100, in other embodiments. Further, for purposes of illustration, the exemplary method 300 is described herein with reference to the computing device 200. And, just as the methods herein should not be understood to be limited to the exemplary system 100, or the exemplary computing device 200, the systems and the computing devices herein should not be understood to be limited to the exemplary method 300.

In this exemplary embodiment, the location detector 120 is described below as performing method 300 in real time, or near real time. As such, as transaction data and location data is received, or accessed, by the location detector 120, the location detector 120 performs as described. Therefore, the scores and/or confidences described herein, based on the location data (and transaction data) may be generated promptly and used often in real-time or near real-time in the same of subsequent transactions. It should be appreciated, however, that in other embodiments, the location detector 120 may operate at different, regular, or irregular intervals, based on historical data, combinations of real time or near real time data and historical data, etc.

In the illustrated method 300, the location detector 120 accesses transaction data for a purchase transaction, at 302, made by consumer 112 at POS terminal 114a associated with merchant 102. The transaction data, in this embodiment, is accessed in near real time, as the purchase transaction is taking place at the merchant 102. The location detector 120 receives (broadly, accesses) the transaction data 304, as it passes through the payment network 106, in route to the issuer 108 seeking authorization of the transaction (or potentially, upon authorization from the issuer 108).

At 306, the location detector 120 optionally (as indicated by the dotted lines) filters (or even excludes) transactions and/or transaction data associated therewith based on the collected transaction data or on availability of sources of more reliable data.

For example, the location detector 120 may exclude, at 306, purchase transactions based on transaction type. Because the method 300 generally relies on the location of a purchase transaction (e.g., the location of the consumer's computing device 200, the location of the merchant's POS terminal 114a, etc.), the location detector 120 may exclude a transaction if the transaction entry mode is "Internet order" to avoid false data points. Or, the location detector 120 may filter a purchase transaction, at 306, and specifically location data for the purchase transaction as included in the transaction data, and use alternative location data when a more trustworthy location source is already available for the POS terminal 114a (e.g., where the POS terminal 114a includes an ATM terminal, for example, which generally has a requirement to have more accurate address data on record; etc.).

Still other aspects of the transaction data may further indicate if a transaction should be filtered or excluded, as should be apparent from the description below.

With continued reference to FIG. 3, if the purchase transaction by the consumer 112 is not excluded, a terminal key number is compiled by the location detector 120 for the transaction, at 308. The terminal key number is used, by the location detector 120, to identify (or associate) purchase transactions to a particular merchant terminal. In the method 300, the terminal key number is at least based on the terminal ID included in the transaction data for the transaction. In particular in the method 300, the terminal key number is based on the terminal ID for the POS terminal 114a, the merchant ID for the merchant 102 and the acquirer ID for the acquirer 104. Combining this data, for example, substantially ensures that the terminal key number is unique to the POS terminal 114a (particularly when, or if, the POS terminal 114a has a different terminal ID than the POS terminals 114b-c). This data may be combined in any suitable manner including, for example, concatenated in series with delimiters, etc. Alternatively, the terminal ID, the merchant ID, and the acquirer ID may be modeled separately, as in three components of a composite key in a database, etc. In any case, the terminal key number is employed, in this exemplary embodiment, as a mechanism to link transactions to a given merchant terminal or terminals. Transactions having the same terminal key number will contribute to one score, as described below.

After (or at the same time or before) identifying the terminal key number and the corresponding POS terminal, the location detector 120 receives location data 312 associated with the consumer's purchase transaction, at 310. The location data 312, for the transaction (or for multiple transactions processed by the location detector 120) may be received, for example, from the consumer's computing device 200 (e.g., a phone, etc.), via network 110 (e.g., as a location message, etc.), or from a third-party provider, or as part of the transaction data. When the location detector 120 accesses transaction data, which includes location data (as indicated by the dotted lines), the location detector 120 is understood to access (or identify) the transaction data and also receive the location data (i.e., it is understood that both operations are performed as one). With that said, in a variety of embodiments in which the location data is provided to the POS terminal 114, it may be static (regardless of the location of the POS terminal), such that the location data is then excluded from the methods herein.

In various embodiments, the location detector 120 may also filter the purchase transaction and/or the location data associated therewith in a similar manner to filtering the transaction data at 306.

For example, the location detector 120 may exclude received location data if the consumer 112 is generally known to have less accurate location data than other consumers. In particular, for consumers that are identified as routinely leave their phones at home when making transactions at POS terminals or that are identified as sharing their phones with others, any resulting location data obtained from the consumers in connection with their transactions may not be reliable or may appear to be fraudulent (i.e., the consumers may appear to be trying to manipulate location data by repeatedly performing transactions at one POS terminal knowing that their phones are at other locations). Taking this into account, in various embodiments, the location detector 120 may even limit consumers to one location data submission per POS terminal, per interval.

In addition, when a transaction is made using a payment card, the location detector 120 may exclude the transaction based on a known geography of an acquirer associated with the merchant involved in the transaction (e.g., based on an acquirer ID included in the transaction data, etc.). For example, if a card present transaction is made at a merchant where the acquirer associated with the merchant only operates in Europe, and the consumer's location is indicated as Brazil (via cell phone location data), then the consumer's indicated location is likely incorrect. Moreover, in some embodiments, acquirers may explicitly register locations of POS terminals associated with their merchants, for those merchants that want to ensure they have the most accurate location data available (such that the registered locations may then be used for the POS terminals in place of any collected location data from consumers). As can be appreciated, this can be particularly useful when the merchants are repurposing terminals in new locations and do not want to suffer declined transactions, for example, while the payment network 106, etc. is learning new locations. Or, location data may be filtered based on when the location data is received.

For example, location data for the consumer's computing device 200 is received, from the computing device 200, at least within about eight hours of a transaction. In such embodiments, location data received for the consumer's computing device 200 that is more than about eight hours later than a time of the transaction, or some other interval, may be filtered or discarded. Further, the location detector 120 may filter location data to exclude locations, which are outside f number of deviation from an average location and/or a prior baseline location of the merchant terminal or terminals.

Next, at 314 in the method 300, the location detector 120 matches the transaction data for the consumer's purchase transaction, and the location data, as necessary. The matching may be accomplished based on temporal indicators, or based on payment account information included in both the transaction data and the location data, or based on combinations thereof. For example, the location detector 120 may match location data that has the same or substantially similar temporal indicator as the transaction data (e.g., may match a location of the consumer's computing device at a time that is the same as or close to a time of the transaction, etc.). Also for example, the consumer 112 may employ an e-wallet application on computing device 200, to complete the transaction at merchant 102, and at POS terminal 114a. The transaction data for the transaction includes a PAN for the consumer's associated payment account as provided by the e-wallet application. The location data, in this example, is separately received from the consumer's computing device 200, and also includes the PAN or other payment account indicator. Upon matching the two PANs (or other indicators), from the transaction data and from the location data (with temporal indicators for each being within a predefined interval (e.g., one minute, two minutes, five minutes, etc.), the transaction data and location data are correlated. It should be appreciated that other manners of matching transaction data and location data may be employed, for example, when the location data is not incorporated into the transaction data (i.e., when the location data is dynamically determined location data, etc.) or when it is excluded from the transaction data.

With further reference to FIG. 3, the location detector 120 optionally (as indicated by the dotted lines) identifies a location of the POS terminal 114a, at 316. This location may be used as a baseline location in connection with scoring other locations of the POS terminal 114a, or it may be used as a basis for comparison to a predefined or predetermined baseline location for the POS terminal 114a.

In some embodiments, different indicated locations for the POS terminal 114a may be averaged to identify the location. Or, the location of the POS terminal 114a may include an average location of the POS terminal 114a, together with POS terminals 114b-c (assuming the POS terminals 114a-c are within a certain boundary range of each other (e.g., about 150 feet, etc.) or alternatively "fuzzed", etc.). For example, if the identified location consists of latitude and longitude coordinates with six decimal places of precision, the location detector 120 may round the identified location, from received location data, to five decimal points or less to abstract the location to a less granular value (and thereby provide a general margin of error). Then, in the case of averaging, a dynamic boundary may exist that starts generally large (e.g., at about one mile, etc.) and gets tighter as more transaction location data points are collected for the POS terminals 114a-c (e.g., tightening to about 50 feet when there are about 1,000 data points, etc.).

The location may also be more elastic when temporal data points for the transaction data are farther apart (e.g., about one mile if the transaction data collection and the location data collection are about three minutes apart but about 100 feet if they are about 3 seconds apart, etc.). It should be appreciated that different temporal thresholds/grace periods may be used for different merchant categories. For example, a merchant that is likely to have a drive through window (e.g., a fast food/coffee merchant, etc.) or a gas station merchant is much more likely to have consumers move several miles toward/away from the merchant within a few minutes prior to and after making a purchase transaction than a department store merchant which requires parking, time to get to the department store for a purchase and then navigate a line to perform the purchase. Similarly, a department store merchant in which location data for a consumer is received about ten minutes prior to a purchase transaction may be weighted higher than location data received about ten minutes after the purchase transaction, as the pre-purchase location data is more likely associated with a location within the department store merchant while the post-purchase location is more likely associated with a transit location of the consumer leaving the merchant. Conversely, for a tavern merchant, the weightings may be reversed as a consumer is more likely to be in transit to the tavern ten minutes prior to any transaction and then loiter in the tavern after the transaction.

With reference back to FIG. 3, the location detector 120 then associates or assigns, at 318, a score to the POS terminal 114*a* and, in particular, to an identified location of the POS terminal 114*a*. The score is representative of a general confidence that the POS terminal 114*a* is actually located at the identified location (based on comparison to a baseline location for the POS terminal 114*a*). The score may include any desired score such as, for example, a numerical score, a symbol score, a letter score, a word score, etc. indicating, generally, a confidence that the POS terminal 114*a* is located at the identified location.

Operations 302-318 are repeated, as additional transactions are made at the POS terminal 114*a* (i.e., at the POS terminal 114*a* having the same terminal key number), and as additional transaction and location data is available for receipt and/or retrieval by the location detector 120. In so doing, the score can be updated to reflect the additional available data and, as necessary, the baseline location for the POS terminal 114*a* can be adjusted or changed when the further data suggests it is out of date or incorrect. It should be appreciated that elasticity, similar to that described above in connection with identifying location of the POS terminal 114*a*, may be similarly applied here to scoring the POS terminal 114*a*. For example, if the consumer's last known location three minutes prior to the purchase transaction is within a mile of the POS terminal 114*a*, it may be considered "generally close", but if it was a mile away three seconds prior to the transaction it may not be considered close.

FIG. 4 illustrates multiple transactions for a number of different terminal key numbers (for a number of different POS terminals). Example applications of the method 300 will be described next, with reference to the multiple transactions and different POS terminals shown in FIG. 4.

In an example application of the method 300, as the number of transactions indicating the same location for the POS terminal 114*a* increases (within a margin of error, and in the absence of a statistically significant number of transactions for the terminal key number indicating a different location), the confidence that the POS terminal 114*a* is located at an identified location (e.g., a baseline location, etc.) improves and, as such, the score may be updated at 318, as appropriate, to indicate the improved confidence for each subsequent transaction. Generally, when this occurs, the POS terminal 114*a* is understood to be at a fixed location. In FIG. 4, the transactions indicated by the characters "F" are all located within close proximity to a given POS terminal, such that a location of the POS terminal associated with the transactions is determined to be a fixed POS terminal location.

Without limitation, it is contemplated that less than 10 transactions indicating the same location for a POS terminal, for example, may likely result in a generally low confidence score, such as about 10%, that the POS terminal 114*a* is actually at the identified location. However, as the number of transactions increases, so does the confidence that the POS terminal is located at the identified location. For example, having 10-50 transactions indicating the same location for the POS terminal may result in a confidence score of about 25%; 51-100 transactions indicating the same location for the POS terminal may result in a confidence score of about 50%; 101-200 transactions indicating the same location for the POS terminal may result in a confidence score of about 70%, 201-10,000 transactions indicating the same location for the POS terminal may result in a confidence score of about 80%; and greater than 10,000 transactions indicating the same location for the POS terminal may result in a confidence score of about 99%. It should be appreciated that other scales may be used to indicate confidence scores (e.g., logarithmic scales, etc.). Further, it is contemplated that, regardless of the scale used, transactions in which location data do not match other location data for a POS terminal may result in a lowering of the confidence score by a greater value than the confidence score would be increased by a transaction in which location data matches other location data (e.g., one miss might take three more hits to overcome, etc.).

Moreover, it is contemplated that temporal factors may be used to weight transactions in connection with determining confidence scores, such that more recent location values may be more highly weighted than older ones. In various embodiments, location data may be weighted, for example, on a sliding scale, etc., based on closeness in time to the transaction with which it is associated. In so doing, a lower difference between a time stamp of the transaction and a time stamp of the consumer's location may result in a higher weighting (which may result in a more specific location score for the POS terminal 114*a* involved in the transaction). As an example, a difference in time between a transaction and a location determination of the consumer of about five seconds may weight the corresponding location score as 100, on a scale of 1-100. However, a difference in time of about eight hours may weight the corresponding location score as 1 on the same scale. Moreover, a difference in time in seconds might identify the location score at a maximum available GPS precision (e.g., one foot, ten feet, fifty feet, 100 feet, etc.), while a difference in time in hours might fuzz the location to a 60 mile radius or greater of the probable location of the transaction. It should be appreciated, though, that numerous data points each having differences in time in hours might still be sufficient to hone in on a location of the POS terminal 114*a* within, for example, a five mile radius (but some data points with time differences in seconds may still be required to narrow the location down to 100 feet, for example).

In another example application, as additional transactions are received at a POS terminal, the location detector 120 may consistently identify second, third and fourth locations for the POS terminal (within a margin of error). In this example, the location detector 120 may then recognize that the merchant 102 likely includes multiple locations, with POS terminals at the different locations sharing the same terminal ID (and the same terminal key number). In response, the location detector 120 assigns individual scores to each of the locations, indicating a confidence that the different POS terminals for the merchant 102 are located at the different indicated locations, for example, based on the number of transactions at each of the POS terminals. In general, the POS terminals are understood to be fixed at the multiple locations, but the confidence interval will be less than in the prior example where the POS terminal is fixed at a single location to account for different locations of the POS terminals with the same terminal key number. In FIG. 4, the transactions indicated by the characters "O" are all located within close proximity to four different locations, while transactions indicated by the characters "B" are all located within close proximity to two locations, such that the POS terminals associated with these transactions (separately, per terminal key number) are determined to be fixed, multi-location POS terminals.

In still another example application, as additional transactions are received and/or retrieved for a POS terminal, the location detector 120 may recognize multiple additional locations corresponding to the terminal key number of the POS terminal. Unlike the prior example, however, the additional locations are only infrequently repeated, or are not repeated at all. The additional locations are, however, as determined by the location detector 120, limited to a particular geographic region (where the size of the geographic region is statistically ascertained, by the location detector 120, based on transaction/location data, etc.). In this example, the POS terminal is understood to be associated with a mobile region-specific merchant (e.g., a food truck merchant, etc.). As such, when this occurs, the score is updated, at 318, to reflect the confidence of the multiple locations within the particular region. The score then increases as more transactions are made at the POS terminal within the region. In FIG. 4, the transactions indicated by the characters "R" are all located within region 402, such that the POS terminal associated with the transactions is determined to be a mobile region-specific POS terminal.

In a further example application, as the number of transactions received and/or retrieved for a POS terminal increases, the location detector 120 may identify multiple different locations, which are unbounded to a single regular (or statistically useful) region. In this example, the POS terminal is understood to be a mobile merchant (e.g., a taxi cab, etc.). In response, the score is updated, at 318, to reflect a lack of confidence in the POS terminal being at a particular location. In FIG. 4, the transactions indicated by the characters "M" are unconfined to a particular region, such that the POS terminal associated with the transactions is determined to be a mobile POS terminal.

The above examples and trends may vary based on the types of merchants and/or the types of products offered for sale by the merchants, and as such, the assigned and/or updated scores for the merchants may vary further based on such merchant-specific factors, as well as others. In addition, it should be appreciated that a variety of statistical methods, as known to those in the art, may be employed, as described herein, to provides scores (indicative of confidence) and/or region/location analysis when, or if, the locations of the transactions vary.

The transaction data and/or location data used herein may be gathered over a period of time, such as, for example, two months, six months, one year, etc. Thus, the trends, as described above, may be based on one or more different periods of time. The periods of time may be variable, and, in numerous embodiments, may be limited to capture most recent data (and to discard/ignore stale data or data beyond the period of time).

Initially, or once the trends, per POS terminal, are established, the location detector 120 may assign the score at 318 in the method 300, as multiple different components. For example, the score may include a location confidence score, which is a confidence that the identified location is the location of a terminal associated with the terminal ID. This location confidence score may be primarily, in some examples, based on the deviation of the locations, identified to the POS terminal. The score may also be assigned with a mobility score, which is indicative of a degree of mobility of the terminal associated with the terminal ID. For example, as illustrated in the above examples, a fixed terminal may be assigned a high mobility score, while a mobile region-specific POS terminal or mobile POS terminal may be assigned a lower mobility score. Further, the location detector 120 may also assign a score having a risk score, which is indicative of a risk associated with the POS terminal, based, at least in part, on prior fraud reporting at the POS terminal and/or in the vicinity of the POS terminal. With regard to the risk score, data used to calculate the score may include crime statistics from maps or other sources. Or, the data may relate to observations such as, for example, that gas pumps requiring zip code approval for processing tends to vary by neighborhood or by gas station type (e.g., urban vs. sub-urban vs. rural, near highway vs. not, etc.), as such approval may often be driven by a likelihood of stolen card fraud and thus may serve as an indicator of regions associated with higher fraud risks.

In several embodiments, the trends in scores may also be used, by the location detector 120, to determine, in various embodiments, whether a change in the location should be investigated (e.g., has a fixed POS terminal moved, etc.), or whether the new location is indicative of potential fraud. This can be seen in FIG. 4, for example, in connection with the transactions indicated by the characters "B". For example, if timestamps for all of the "B" transactions in cluster 404 are prior to a particular date, and timestamps for all of the "B" transactions in cluster 406 are after the particular date, the location detector 120 may decide that the terminal was moved on or about the particular date, from the location at cluster 404 to the location at cluster 406. After a period of time (to ensure that the location at cluster 406 is not a temporary location, for example, where the location at cluster 406 is closed for renovation, etc.), the location detector 120 may stop accepting the older location as a high confidence, and the transactions associated with the older location may then be entirely aged off.

In multiple embodiments, the scores are provided to the issuer 108, who may use the scores as a basis for accepting or declining transactions. While the scores may be shared with and/or used by any entity in FIG. 1, for example, the scores (and locations) are specifically useful in the authorization process, by the payment network 106 and/or the issuer 108. While the rules and/or conditions provided next are described with reference to the issuer 108, it should be appreciated that other entities, including the payment network 106, may employ the same or similar processes, or decisions, relevant to the entities role in payment transactions.

Initially, the issuer 108 may decline a transaction if the consumer 112 is not likely at the particular location of the POS terminal 114a as determined by the score. With the terminal location indicated by the method 300, with a score representing confidence in that location, the issuer 108 may set a minimum threshold for the score and/or a maximum distance of the consumer 112 (and in particular, the consumer's computing device 200) from the terminal location. For example, if the score is based on a range of 0-100, the issuer 108 may, for example, require the consumer's computing device 200 to be within 50 meters of the determined location, when the score is within the range 80-100. Further, with reference to FIG. 4, a single transaction "F" is separate from, or outlying from, all other transactions "F." Accordingly, the issuer 108, based on the location (and potentially additional information) may decline the transaction, or otherwise flag the transaction as potentially fraudulent, or further still, apply one or more different rules to the particular outlying transaction (e.g., a different threshold amount to approve/decline (e.g., decline over $50.00, etc.), etc.).

Additional examples of using the generated score for the POS terminal 114a in connection with processing transactions are provided next.

In one example, when the location detector 120 determines that a location of the consumer's computing device 200 and a location of the POS terminal 114a are both known within a predefined time (e.g., within one minute, three minutes, etc.), but the locations wildly diverge, and that a payment card is present (via transaction data), the issuer 108 may decline the transaction. Alternatively in this example, the issuer 108 may take one or more of the following actions: transfer the transaction to a real time fraud-scoring unit, push an alert (e.g., a transaction alert, etc.) to the consumer 112, require a PIN authorization for the transaction instead of a signature, only approve the transaction to a lower amount than might otherwise be approved (e.g., some issuers may then return the availability to transact at a higher amount when the payment card is processed at the POS terminal 114a which may or may not also be capped to a lower amount, etc.), etc.

In another example, when the location detector 120 determines that the consumer 112 is present at the POS terminal 114a, but the transaction might otherwise appear risky (e.g., the transaction is a cross border transaction, etc.), the issuer 108 may approve the transaction anyway. In still another example, when the location detector 120 determines that the consumer's computing device 200 is in close proximity to the POS terminal 114a, the issuer 108 may count this as a stronger authentication with possible impacts to streamlining interchange in connection with processing, clearing and settling the transaction, etc.

In another example, the location detector 120 may use the location data for later analytics such as common point of purchase fraud analytics, for example, to discover if skimmers have been installed in a particular area (e.g., such as a ten block strip of gas station pumps, etc.). In still another example, when the location detector 120 determines that the consumer's computing device 200 is present at the POS terminal 114a, and the transaction is not identified as a mobile transaction (in the transaction data), the issuer 108 may decline the transaction (since tokenized mobile transactions may be safer than payment card transactions). In this example, the payment card may still be used in transactions where the consumer's computing device 200 is not present (e.g., forgotten, broken, dead battery, etc.), but when both are present the issuer may require the mobile transaction.

With that said, it is contemplated that several rules, relating to processing transactions, as described in the above examples, may be included in an application for the consumer 112, where the consumer 112 can set or modify his/her own controls for processing transactions (e.g., decline (or alert) when the consumer's mobile location does not match the merchant's POS terminal location or the merchant's location, etc.).

The determined location of the POS terminal 114a may further be used to augment other rules. For example, if the consumer's computing device 200 is at a location within 20 meters (or other deviation) of the identified terminal location, the issuer 108 may approve a transaction that it may have otherwise declined (i.e., a risky transaction, etc.) (e.g., if the confidence score of the terminal 114a being at the identified terminal location satisfies one or more threshold, etc.). Additionally, or alternatively, the issuer 108 may further use the determined terminal location, in combination with historical fraud modeling for a geographic region, to accept or decline transactions. For example, the location detector 120 may model chargebacks for various issues or concerns, such as clone card issues, and map those to geolocation regions (and also taking into account crime statistics for the regions). This could then adjust a trustworthiness score of all terminals in the region. As such, if a region has a high proportion of fake cards, then a failed location check could deny the transaction instead of merely creating a case for investigation of possible fraud. Or, in some embodiments, all transactions from terminals in a high risk region would go to real time fraud scoring, by default.

In addition to using the identified location of the POS terminal 114a for transaction decisions, the payment network 106 may further disseminate the identified location (as well as identified locations for other POS terminals) to consumer 112 (or to other consumers), when a score of the location of the POS terminal 114a is above a certain threshold, for example, to aid the consumer 112 in locating the merchant 102 or other merchants (not shown). The location may be disseminate along with the name of the merchant 102 and/or merchant category code(s) (MCC) for the merchant 102, thereby permitting the consumer to search based on merchant name and/or category.

Further, the payment network 106 may make the terminal location available to consumer 112 in connection with one or more different transaction reporting mechanisms. In one exemplary embodiment, an e-wallet application, at the consumer computing device 200, may be configured to view a last, recent, or other transaction, and select a "find recent location" option to view the terminal location for the transaction (e.g., either in text, or via a companion map application in the consumer's computing device 200, etc.). In this embodiment, the e-wallet application may rely on the general terminal location as determined in method 300, or a specific location for the transaction, as correlated at 314-316 in method 300. For example, a consumer, who visited a food truck, may not recall the location, and may want to go back to that location (i.e., the location of the original transaction) and/or a known region, or trend, of the food truck's location, to re-patronize the food truck. It should be appreciated that other correlations between transactions and location of the POS terminal involved in the transactions may be used in a variety of ways, by the consumer 112, the acquirer 104, the payment network 106, and/or the issuer 108, and may be accessible via many different computing device as shown in FIG. 1 and otherwise.

In other embodiments, upon locating various terminals within a region, the location detector 120 may provide data to consumers relating to average spend (e.g., spend per transaction, etc.) at different merchants in the region, associated with the terminals (based on transaction data from the terminals). As such, for consumers planning a vacation, the consumers can estimate how expensive it may be to visit the region (based on average spend in the region by merchant or by merchant category), or particular locals within the region, to best pick a destination that matches their budgets. In a similar application, for consumers looking for houses or apartments to buy or rent, the consumers can estimate cost of living in region, or in different neighborhoods in the region.

As can now be appreciated, in various embodiments herein, the location detector 120 may learn locations of terminals, as consumers transact at them, such that appropriate statistical inferences can be made (e.g., via various rules, via artificial intelligence, etc.). As such, the location detector 120 can determine if the terminals reside in fixed locations, are at multiple fixed locations due to merchant terminal ID sharing, are mobile in limited geographies, or are so mobile that they cannot be usefully judged as to whether or not transactions are "at" locations of the terminals. Further in the systems and methods herein, once merchant terminals are baselined, individual transactions can then be scored by the location detector 120 as whether they are likely "at" the terminals or not. Such scores can be degrees of confidence that the consumers' portable communication devices are present, degrees of confidence that the devices are not present, etc. In various aspects, the scores may also include measures of fraud likelihood at geographic locations for fixed location terminals. Further, the location detector may learn changes over time for terminal locations and re-baseline the terminals as appropriate or needed (e.g., for moved terminals, etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of: (a) accessing transaction data for a transaction to a payment account between a merchant and a consumer at a merchant terminal, the transaction data including a terminal ID for the merchant terminal, a merchant ID of the merchant, an acquirer ID for an acquirer associated with the merchant, and a temporal indicator; (b) receiving location information associated with the transaction; (c) identifying a location associated with the location data as a location of the merchant terminal; and (d) assigning a score to the identified location indicative of a confidence that the identified location is the actual location of the merchant terminal.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," or "included with" another element or layer, it may be directly on, engaged, connected or coupled to, or associated with the other element or layer, or intervening elements or layers may be present. As used herein, the term "and/or" includes any and all combinations of one or more of the associated listed items.

In addition, as used herein, the term product may include a good and/or a service.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in locating one or more merchant terminals, based on transaction data, the method comprising:

accessing, by a computing device, transaction data for at least one transaction between a merchant and at least one consumer, the at least one transaction being at a merchant terminal and to a payment account associated with the at least on consumer, the transaction data, for each of the at least one transaction, including a payment account indicator, a terminal ID for the merchant terminal, a merchant ID of the merchant, an acquirer ID for an acquirer associated with the merchant, and a temporal indicator;

receiving, by the computing device, a location message from at least one portable communication device associated with the at least one consumer, the location message including location data associated with the at least one transaction, the location data also including a location of the at least one portable communication device, the payment account indicator, and the temporal indicator;

matching the transaction data to the location data based on the payment account indicator and the temporal indicator;

identifying, by the computing device, a location associated with the location data as a location of the merchant terminal; and assigning, by the computing device, a score to the identified location, the score including a mobility score indicative of a degree of mobility of the merchant terminal associated with the terminal ID.

2. The computer-implemented method of claim 1, wherein the location of the at least one portable communication device associated with the at least one consumer includes the location of the at least one portable communication device within an interval of the at least one transaction.

3. The computer-implemented method of claim 1, wherein identifying the location associated with the transaction data as the location of the merchant terminal includes averaging the location data associated with multiple transactions at the merchant terminal including the at least one transaction, said identified location being the averaged location data; and wherein assigning said score to the identified location includes assigning said score based on a total number of transactions included in the at least one transaction and a series of thresholds associated with the total number of transactions.

4. The computer-implemented method of claim 3, further comprising filtering the location data based on a known geography of the acquirer associated with the merchant involved in the at least one transaction; and wherein averaging the location data includes averaging the filtered location data.

5. The computer-implemented method of claim 1, further comprising compiling a terminal key number for the merchant terminal based on the terminal ID; and wherein assigning said score includes updating the score, based on one or more additional transactions associated with the terminal key number.

6. The computer-implemented method of claim 1, wherein the assigned score further includes a location confidence score indicative of a confidence that the identified location is the actual location of the merchant terminal.

7. The computer-implemented method of claim 1, wherein assigning said score includes updating the score, based on one or more additional transactions at said merchant terminal.

8. The computer-implemented method of claim 1, further comprising disseminating the score to at least one issuer, whereby the score is usable by the issuer to detect fraud.

9. The computer-implemented method of claim 1, wherein assigning the score to the identified location includes assigning the score based on a deviation of the location data associated with the at least one transaction.

10. The computer-implemented method of claim 9, wherein assigning the score to the identified location further includes assigning the score based on a weighting of the location data associated with the at least one transaction, the weighting based on a closeness in time of the location data to the at least one transaction.

11. A non-transitory computer readable storage media including executable instructions that, when executed by at least one processor, cause the at least one processor to:

for each transaction by a consumer at a merchant terminal associated with a merchant:

match transaction data for the transaction to location data for a portable communication device associated with the consumer in real time, or near real time, upon receipt of the location data, whereby the location data is identified to the transaction, the transaction data including a terminal ID for the merchant terminal, a merchant ID of the merchant, an acquirer ID for an acquirer associated with the merchant, and a temporal indicator; and compile a terminal key number for the transaction based on the terminal ID, the merchant ID, and the acquirer ID;

combine the location data identified to each transaction having the same terminal key number; and assign a score to a location, included in the combined location data indicative of a confidence that the location is an actual location of the merchant terminal.

12. The non-transitory computer readable storage media of claim 11, wherein, for each transaction, the location data identified to the transaction is included in a location message received from the portable communication device associated with the consumer performing the transaction, the location data including the location of the portable communication device and a temporal indicator; and wherein, for each of transaction, the executable instructions, when executed by the at least one processor, cause the at least one processor to match the transaction data for the transaction to the location data identified to the transaction when the temporal indicator of the transaction data is within a predefined interval of the temporal indicator of the location data.

13. The non-transitory computer readable storage media of claim 11, wherein the executable instructions, when executed by the least one processor, further cause the at least one processor to provide the score to at least one issuer associated with one or more payment accounts, whereby the issuer is able to decline an authorization request for a transaction to the merchant and involving a payment account of a consumer when a portable communication device of the consumer is more than a deviation from said location and the score satisfies at least one threshold.

14. The non-transitory computer readable storage media of claim 11, wherein the executable instructions, when executed by the least one processor, further cause the at least one processor to filter at least one of the transaction, the transaction data, and the location data.

15. The non-transitory computer readable storage media of claim 11, wherein the score further includes a mobility score indicative of a degree of mobility of the merchant terminal associated with the terminal ID.

16. The non-transitory computer readable storage media of claim 11, wherein the executable instructions, when executed by the at least one processor, cause the at least one processor to, in connection with assigning the score to the location, assign the score to the location based on a deviation of the location data matched to the transaction data.

17. The non-transitory computer readable storage media of claim 16, wherein the executable instructions, when executed by the least one processor, further cause the at least one processor to, in connection with assigning the score to the location, assign the score to the location based on a weighting of the location data matched to the transaction data, the weighting based on a closeness in time of the location data to the transaction.

18. A system for use in locating one or more merchant terminals based on a combination of transaction data for transactions made by consumers at the merchant terminals and location data for portable communication devices associated with the consumers, the system comprising:
- a payment network configured to process multiple transactions between consumers and a merchant made at a merchant terminal associated with the merchant; and
- an engine comprising a processor coupled to the payment network, the processor configured, by executable instructions, to:
  - access transaction data from the payment network, the transaction data representative of the multiple transactions and, for each of the transactions, including a terminal ID for the merchant terminal, a merchant ID of the merchant, an acquirer ID for an acquirer associated with the merchant, and a temporal indicator;
  - for each of the multiple transactions, access location data for a portable communication device associated with the consumer making the transaction, the location data including at least one temporal indicator substantially similar to at least one of the temporal indicators of the transaction data;
  - filter the accessed location data based on a known geography of an acquirer associated with the acquirer ID in the transaction data;
  - identify a location based on matching the transaction data and the filtered location data;
  - assign a score to the identified location, indicative of a confidence that the identified location is an actual location of the merchant terminal, the score based on a deviation of the location data for the multiple transactions; and
  - provide the score to at least one issuer associated with one or more payment accounts, whereby the issuer is able to decline an authorization request for a transaction to the merchant based on the score.

\* \* \* \* \*